United States Patent [19]
Darnell

[11] 3,908,287
[45] Sept. 30, 1975

[54] MATHEMATICS VISUAL TEACHING AID

[76] Inventor: Eula K. Darnell, 307 Baldwin, West Helena, Ark. 72390

[22] Filed: July 12, 1974

[21] Appl. No.: 488,182

[52] U.S. Cl............................ 35/31 D; 35/70; 35/73
[51] Int. Cl.².......................................... G09B 19/02
[58] Field of Search .......... 35/30, 31 R, 31 D, 31 F, 35/31 G, 32, 33, 69, 70, 71, 72, 73; 40/135

[56] References Cited
UNITED STATES PATENTS

| | | | |
|---|---|---|---|
| 1,349,776 | 8/1920 | Mackintosh | 35/73 |
| 1,826,034 | 10/1931 | Williamson | 35/73 |
| 2,207,585 | 7/1940 | Gasper | 40/135 |
| 2,369,804 | 2/1945 | Schoolfield et al. | 35/35 H |
| 2,866,278 | 12/1958 | Snarr | 35/31 F |
| 2,958,961 | 11/1960 | Wheeler | 35/73 |
| 3,129,518 | 4/1964 | Burris | 35/31 D |
| 3,521,383 | 7/1970 | Terwilleger | 35/31 D |

*Primary Examiner*—Wm. H. Grieb

[57] ABSTRACT

A mathematics visual aid particularly useful in teaching subtraction to slow learners. The apparatus includes in a preferred embodiment form a base member having a working surface which is inclined with respect to the user and is further divided into a plurality of compartments or receptacles. The receptacles are arranged in columns, from right to left, which correspond to the increasing place-value components 1, 10, 100, 1000, . . . , etc. The apparatus includes a plurality of sets of workpieces, the workpieces with each set corresponding to one place-value component. The workpieces are integrally formed in three dimensions so as to have the actual physical configuration corresponding to one of the place-value components. The columns of receptacles have a varying width such that each column of receptacles corresponds to one of the place-value components and is sized so as to accommodate the unique workpiece corresponding to that place-value. The columns of receptacles are preferably divided into at least two rows, one of which will accommodate nine workpieces, the other of which accommodates ten workpieces placed in an end-to-end planar relationship. The apparatus is designed to visualize in the most elemental terms the concept of regrouping a higher order place value component into a lower order component so as to facilitate the teaching process associated with subtraction.

12 Claims, 11 Drawing Figures

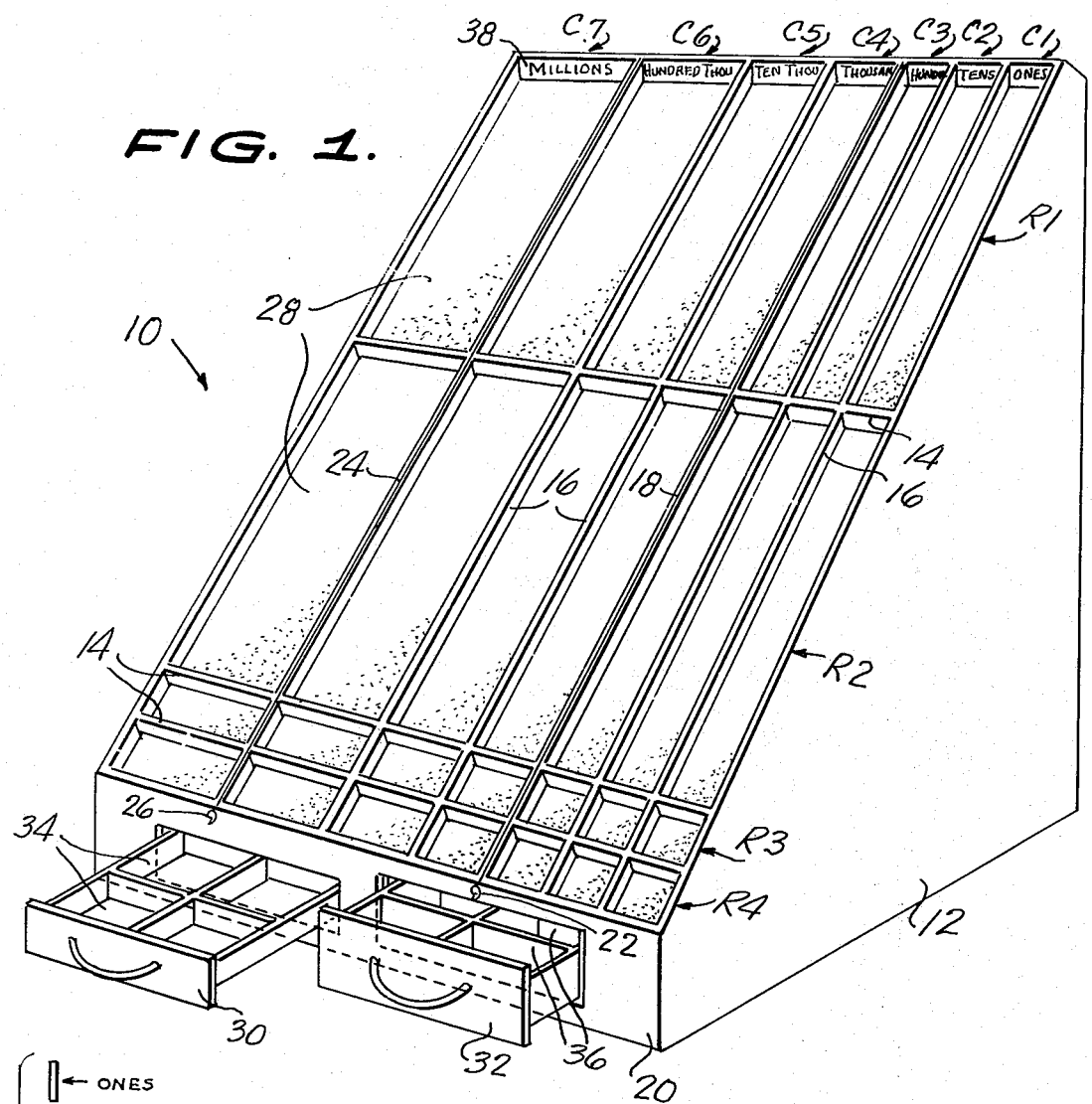
FIG. 1.
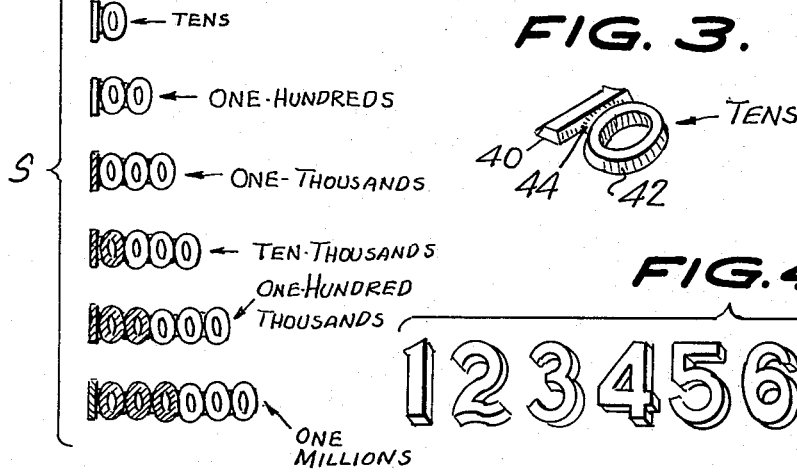
FIG. 3.
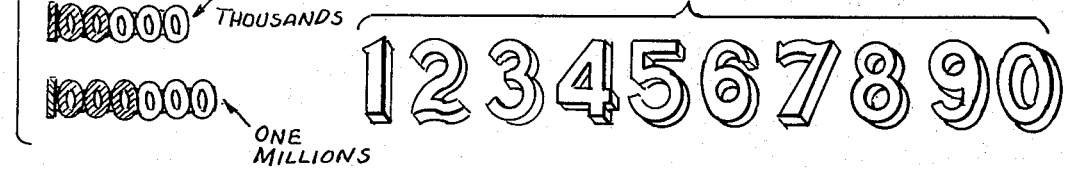
FIG. 4.
FIG. 2.

FIG. 5.

| | C7 | C6 | C5 | C4 | C3 | C2 | C1 | |
|---|---|---|---|---|---|---|---|---|
| 9 { | 1000000 1000000 1000000 | 100000 | 10000 10000 10000 10000 10000 10000 | 1000 1000 1000 1000 1000 1000 1000 1000 | 100 100 | 10 10 10 | 1 +++ | R1 |
| 10 { | | | | | | | | R2 |
| | 3 | 1 | 6 | 8 | 2 | 3 | 4 | R3 |
| | 2 | 9 | 5 | 7 | 3 | 6 | 3 | R4 |

FIG. 6

| | C4 | C3 | C2 | C1 | |
|---|---|---|---|---|---|
| | 1000 1000 1000 1000 1000 1000 1000 1000 | 100 ~~100~~ | 10 10 10 | 1 | R1 |
| | | | 10 10 10 10 ~~10~~ ~~10~~ ~~10~~ ~~10~~ ~~10~~ | | R2 |
| | 8 | 2 | 3 | 4 | R3 |
| | 7 | 3 | 6 | 3 | R4 |

FIG. 7.

| | C4 | C3 | C2 | C1 | |
|---|---|---|---|---|---|
| | 1000 1000 1000 1000 1000 1000 1000 ~~1000~~ | 100 | 10 10 10 | 1 | R1 |
| | | | 100 100 100 100 100 100 ~~100~~ ~~100~~ ~~100~~ | 10 10 10 10 | R2 |
| | 8 | 2 | 3 | 4 | R3 |
| | 7 | 3 | 6 | 3 | R4 |

MATHEMATICS VISUAL TEACHING AID

BACKGROUND OF THE INVENTION

1. Field of the Invention

This invention relates generally to the art of mathematics instruction and, more particularly, is related to an apparatus and associated methods for visually conveying to students the process involved in subtraction.

2. Description of the Prior Art

Various methods and apparatuses have been heretofore proposed for use as visual teaching aids in mathematics. Many of such devices have relied on the principles of the ancient abacus, a counting frame with rows of beads sliding on wires. Such devices have taken numerous forms in the past, but all have as a common objective the provision of a visual teaching aid and method which simplifies, as much as possible, the basic concepts of the principles of operation involved in mathematics. Prior United States patents in this art of which I am aware include the following: U.S. Pat. Nos. 1,826,034; 2,369,804; 2,866,278; and 3,129,518.

Each of the foregoing apparatuses suffers from one or more deficiencies. In my view, the proliferation of prior art attempts in devising a simplified visual teaching aid attests to the fact that there still exists a tremendous need to simplify and clarify such apparatuses and associated instructional techniques until everything possible has been done to meet the needs of the slow-learning child having limited abilities, such as a retarded child. While many prior art devices have attempted to expand or generalize an overall understanding of arithmetic, such expansion and generalization, I have found, often obscures the necessary and basic concepts involved in, for example, subtraction, to the slow-learning or retarded child. Given the fact that the communication of mathematical concepts is most difficult with a slow-learning or retarded child, it follows that the greatest need exists for a device which can be utilized as a visual mathematical teaching aid when dealing with such disadvantaged children or slow-learning students.

Another deficiency inherent in prior art devices is their limited ability to appeal only to a childs visual learning sense. While several prior art devices do exhibit manual manipulation of beads, logs, or the like, the mathematical values represented by such workpieces must be retranslated into numerical components to complete the learning process. The additional step of translating representative workpieces into associated component values is, I have found, a substantial inhibiting factor in the learning processes involved with a retarded or otherwise slow-learning student. It is therefore seen that an apparatus and method which can, by and large, eliminate this intermediate step would be of great value.

OBJECTS AND SUMMARY OF THE INVENTION

It is accordingly a primary object of the present invention to provide a mathematics visual aid which simplifies and clarifies to the utmost degree the learning processes invloved in teaching mathematics to a slow-learning or retarded student.

Another object of the present invention is to provide a mathematics teaching aid which is extremely simple and straight forward to manipulate.

An additional object of the present invention is to provide a mathematics teaching aid which is particularly useful in appealing to a student's tactile, as well as visual, sense.

An additional object of the present invention is to provide a mathematics teaching aid and method for the use thereof which facilitates greatly the learning processes involved in teaching subtraction to slow-learning or retarded students.

The foregoing and other objects are attained in accordance with one aspect of the present invention through the provision of a mathematics visual aid useful in teaching the importance of the place value components 1, 10, 100, 1000, etc., which comprises a support member having a surface thereof divided into a plurality of work areas arranged in a column and row form. There is provided one column corresponding to each place value component, i.e. ones, tens, hundreds, thousands, ten thousands, etc. The work areas, which preferably comprise receptacles for workpieces are arranged in increasing widths from right to left. The visual aid further includes the provision of a plurality of sets of workpieces, the number of sets corresponding to the number of columns of place value components. The workpieces within each set have a three dimensional physical configuration corresponding to one of the place value components. The width of the components of each set correspond to the width of its corresponding column such that each column is designed to accommodate only those workpieces having the appropriate place-value. At least two rows of work areas or compartments are defined for each column, one row having an area for accommodating no more than nine workpieces, the other row having an area for accommodating no more than ten workpieces. The latter row is extremely useful in the subtraction process for illustrating regrouping of a higher order place value component to its ten lower order components. Further rows of compartments may be provided such that the problem to be worked by the student may be readily displayed.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a perspective view of a preferred embodiment of the mathematics teaching aid according to the present invention;

FIG. 2 is a schematic view of the workpieces forming part of the present invention which are utilized in conjunction with the apparatus shown in FIG. 1;

FIG. 3 is a perspective view showing in more detail the construction of one of the workpieces;

FIG. 4 illustrates a set of Arabic numerals which form numeral workpieces utilized in the present invention;

FIGS. 5 through 8 are diagrammatic views of the apparatus depicted in FIG. 1 which are helpful in understanding the use of the present invention in connection with a substraction problem; and FIGS. 9 through 11 are likewise schematic views of the apparatus of FIG. 1 illustrative in demonstrating the utilization of the present invention for an addition problem.

DETAILED DESCRIPTION OF A PREFERRED EMBODIMENT

Referring now to the drawings, wherein like reference numerals represent identical or corresponding parts throughout the several views, and more particularly to FIG. 1, there is shown in a perspective view the teaching aid apparatus in a preferred embodiment of the present invention. The apparatus is seen to comprise a support member which includes side panels 12, a rear panel and base (nor shown), a front panel 20, and an inclined work surface indicated generally by the reference numeral 10. Work surface 10 is divided into a plurality of compartments or receptacles by horizontal divider bars 14 and vertical divider bars 16. In this embodiment, divider bars 14 and 16 define twenty-eight individual compartments which are arranged in seven columns designated by C1, C2, C3, C4, C5, C6, and C7 and four rows designated by R1, R2, R3 and R4. The seven columns C1 through C7 may be respectively labeled ONES, TENS, HUNDREDS, THOUSANDS, TEN THOUSANDS, HUNDRED THOUSANDS, MILLIONS, to correspond to the seven place-value components 1, 10, 100, 1000, 10,000, 100,000 and 1,000,000, utilized in this embodiment. It is to be understood that either a greater or fewer number of columns may be included, depending on the number of place-value components desired to be utilized within any application.

The actual working surface 28 may be made of any suitable material compatible with the nature of the workpieces to be placed thereon. For example, work surface 28 may comprise a flannel board to which workpieces made of, for example, papier-mache will conveniently adhere. Alternatively, work surface 28 may be made of steel to accommodate magnetic workpieces. It is apparent that the latter configuration would allow the plane of the working surface 10 to be oriented in any convenient direction. It is also seen that the verticle dividing bars between columns C3 and C4, and columns C6 and C7 may be provided with an identifying stripe, such as 18 and 24, to indicate to the student those place-value components between which is normally positioned a comma, such as indicated at 22 and 26, respectively.

On the front panel 20 are shown two slidable drawers 30 and 32 containing compartments 34 and 36, respectively, for housing the various workpieces utilized in connection with the apparatus.

Shown in FIG. 2 are seven sets of workpieces S which are utilized in conjunction with the apparatus depicted in FIG. 1. The workpieces depicted in FIG. 2 are three dimensional in form, as best seen in FIG. 3, and are integrally molded so as to form a unitary workpiece indicative of the place-value represented. Shown in FIG. 2 are the seven sets of workpieces corresponding to the place-value columns C1 through C7. The workpieces S may be formed by any convenient method, and may, as seen in FIG. 3, be formed of individual "1"s 40 and individually molded "0"s 42 joined together at 44 to represent a TENS workpiece. Similarly, the remaining place-value components may be formed by adding the appropriate number of "0"s to the string so as to form a complete set of place-value component workpieces. The height of the workpieces are all substantially the same, while the width varies according to the number of integers in the individual workpiece. Accordingly, it is seen that the size of the respective sets of workpieces gradually increases from the ONES to the ONE MILLIONS workpieces. The ONES column C1 of FIG. 1 has a width which is just sufficient to accommodate the ONES workpieces shown in FIG. 2. Likewise, the columns C2 through C7 respectively have ever increasing widths to accommodate their corresponding workpieces TENS through ONE MILLIONS. In this manner, during the utilization of the device, the student is encouraged to place the proper workpiece with its corresponding column. The compartments in row R1 are designed to have an elongate dimension which is just sufficient to accommodate nine workpieces on the surface 28 when arranged in an end-to-end fashion. On the other hand, row R2 is designed to accommodate ten of the same workpieces similarly arranged, for reasons which will become more clear hereinafter.

Shown in FIG. 4 are three dimensional numeral workpieces which consist of the ten Arabic integer numbers. These numeral workpieces are used in connection with rows R3 and R4 in a manner to be described in more detail hereinbelow. The height of the receptacles in rows R3 and R4 are, of course, sufficient to accommodate a single numeral from the numeral workpieces shown in FIG. 4. The numeral workpieces shown in FIG. 4 may be conveniently stored in compartments 34 of drawer 30, while the workpieces shown in FIG. 2 may be conveniently stored in compartments 36 of drawer 32, either before, during or after use. It is also noted with respect to the workpieces shown in FIG. 2 that they may be differently colored by groups of three zeros as shown by the shadings in order to facilitate the learning process.

Figures 8, 9, 10, 11:
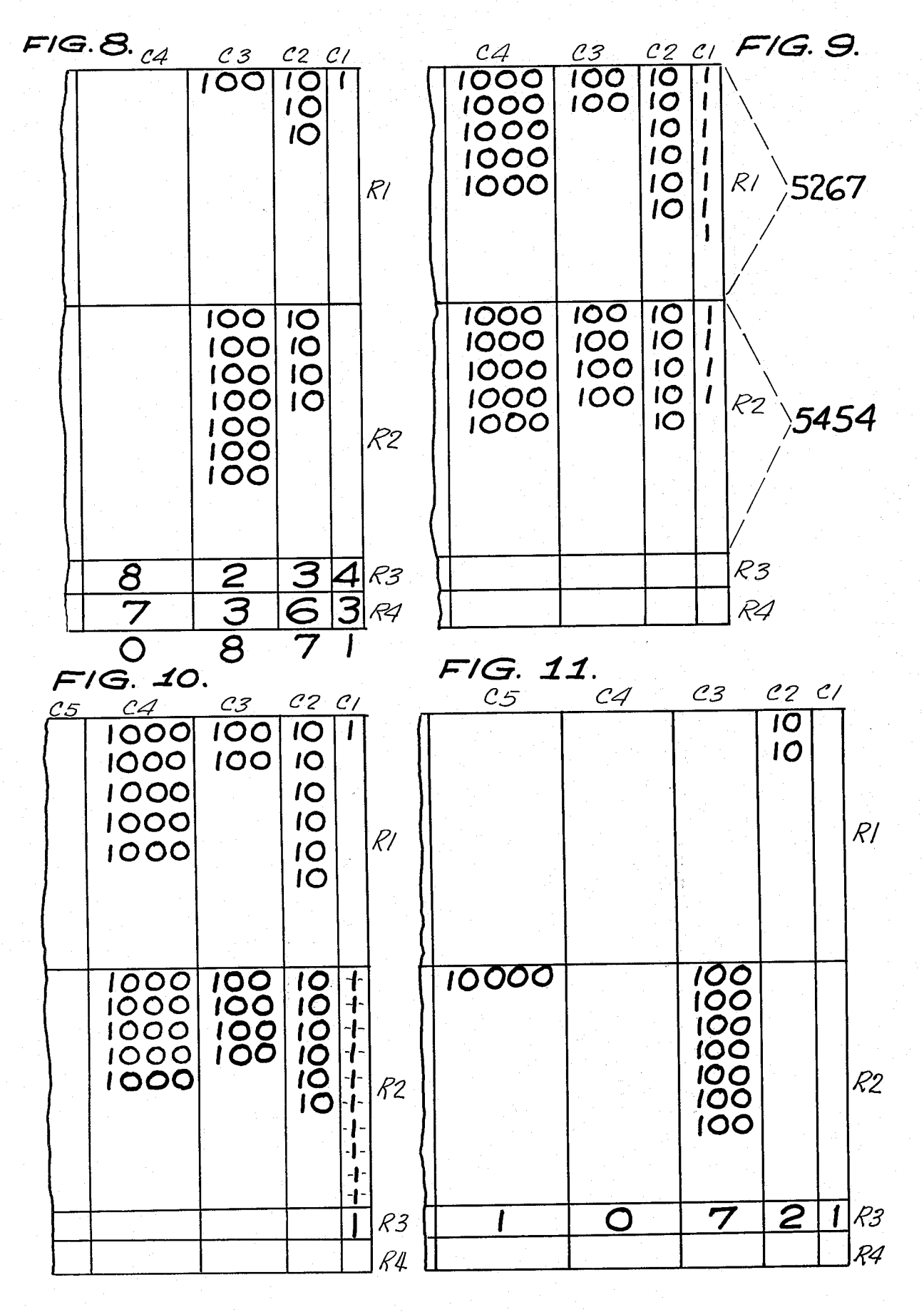

The utilization of the apparatus described above may be conveniently illustrated with reference to FIG. 5 through FIG. 8 which illustrate a representative subtraction problem. Referring to FIG. 5 first, there is shown a plan schematic view of the seven columns C1 through C7 and the four rows R1 through R4 of the apparatus depicted in FIG. 1. The subtraction problem to be worked is first presented in rows R3 and R4 by use of the Arabic numeral workpieces depicted in FIG. 4. One of each of such workpieces are placed in the corresponding place-value column. The problem presented for the purposes of illustration is as follows:

$$\begin{array}{r} 3,168,234 \\ -\phantom{0}2,957,363 \\ \hline \end{array}$$

The minuend may be readily placed with the Arabic numerals by the student in row R3, while the subtrahend is placed in row R4. The student then utilizes the place-value component workpieces shown in FIG. 2 to restate the minuend in the compartments of row R1. Accordingly, three ONE MILLIONS workpieces are placed in column C7, one ONE HUNDRED THOUSANDS is placed in column C6, six TEN THOUSANDS are place in column C5, and so on, until the entire minuend has been entered in row R1. It is important to note at this state that by utilizing the novel configuration of workpieces illustrated in FIG. 2, the student is actually seeing and touching the precise place-value components with which he will need to deal with later, thereby providing a tactile as well as visual dimension to the teaching capabilities of the invention.

The student then may easily deal with one column, i.e. one place-value at a time, in working the subtraction problem. Beginning with the rightmost column C1, the student sees the numeral "3" in row R4 and merely removes three ONES from the original four ONES in column C1, illustrated in FIG. 5 schematically by dotted horizontal lines. This ordinarily presents no problem. However, the second or TENS column C2 represents a bit of a paradox to the slow-learner. He sees that there are only three TENS in column C2, yet he is asked to take away six TENS as indicated in row R4. the student at this point must realize that he must find some additional TENS and that he can do this by moving to the next column C3 and borrowing a ONE HUNDRED.

The latter step of the subtraction operation is seen with reference to FIG. 6, where a ONE HUNDRED has been "borrowed" from column C3 (as indicated by the horizontal dotted line) and has been replaced by ten TENS in row R2 of column C2. The student then has a total of thirteen TENS in column C2 from which it is a simple matter to remove the six TENS (as indicated by the horizontal dashed lines). The result is that seven TENS remain in column C2, which is the correct answer for that place-value.

In moving on to the ONE HUNDREDS column C3, it is seen in FIG. 7 that there remains only one ONE HUNDRED in row R1 of column C3. The student is asked to subtract three ONE HUNDREDS by the numeral appearing in column C3, row R4. This he cannot do, so he must again borrow a ONE THOUSAND from column C4 (as indicated by the horizontal dotted line) and place the ten ONE HUNDREDS he has borrowed in row R2 of column C3. In this fashion, similar to the foregoing, he may then easily remove the three ONE HUNDRED workpieces from row R2, thereby leaving his with eight ONE HUNDRED workpieces, the correct answer for the ONE HUNDREDS place-value component. In column C4, the student then must subtract seven ONE THOUSANDS from the seven remaining, which is a simple matter. The resultant configuration for columns C1 through C4 of the problem depicted in FIG. 5 is shown in FIG. 8. It is seen that by virtue of the successive borrowing and moving from the right to the left, the entire problem may be easily and simply worked out.

While row R1 is utilized to restate the minuend of the problem, and therefore needs to accommodate at the most only nine workpieces, row R2 is importantly utilized to regroup ten lower order workpieces from the higher order place-value component "borrowed." Row R2 therefore provides a tremendous visual aid in showing the student exactly how many workpieces may be regrouped from the next higher order place-value component. Further, the utilization of the three dimensional workpieces shown in FIG. 2, which have the same configuration as the place-value components themselves, eliminates the intermediate step of having to reidentify the workpieces with a numerical value. That is, when a student is asked to remove three TENS or four ONE HUNDREDS, or is asked to regroup a ONE THOUSAND to ten ONE HUNDREDS, he may do precisely that. This provides a tactile as well as visual impact on the learning process. I have also found this configuration to be especially advantageous in the case of teaching older slow students who object to using materials which could be characterized as playthings, such as logs or cards or other such devices, which are obviously meant for lttle children.

FIGS. 9 through 11 illustrate one possible method of utilizing the apparatus of the present invention in a simple addition problem, although it will be apparent that many other possible methods may be utilized. In the embodiment depicted in FIG. 9 which illustrates for brevity only columns C1 through C5, the number of workpieces corresponding to the proper place-values are placed in row R1 according to one addend, while the other addend is represented by the appropriate number of workpieces in row R2. Starting form column C1, the student will transfer the ONES from row R1 to row R2 until the latter row is filled with ten ONES workpieces. At this point, he will realize that he may substitute a TEN for the ten ONES in row R2 and he will remove the ten ONES in row R2, column C1 and replace them with a TEN in row R2 of column C2, as best seen in FIG. 10. The number of ONES remaining in column C1 is the answer for this place-value and may be placed in row R3 by one of the Arabic numerals shown in FIG. 4. In a like manner, the student may proceed with the remaining columns C2 through C4, moving the workpieces in row R1 to row R2 until the latter row is filled and then substituting a next higher order place-value component for the filled lower order compartment. If the lower order compartment is not filled, the student simply moves on to the next column to complete the problem. The result for the problem indicated in FIG. 9 is shown in FIG. 11.

Although I believe that the primary utilization of the device of the present invention is in connection with teaching the processes associated with subtraction, it is seen that the concepts shown with addition may also be taught. Of course, it will be apparent to a person of ordinary skill in the art that multiplication and division, which are simple extensions of basic addition and subtraction, may also be taught by utilizing the device of the present invention.

It is apparent numerous modifications of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A mathematics visual aid useful in teaching the importance of the place-value components 1, 10, 100, . . . , $10^n$ ($n=0, 1, 2, \ldots$), which comprises:
 a support member:
 divider means formed on a surface of said support member for defining a plurality of columns of work areas and at least first and second rows of work areas; and
 a plurality of sets of workpieces, the number of said sets corresponding to the number of said columns of work areas, each of said columns having a unique set of workpieces associated therewith, all the workpieces within each of said sets sharing a common physical configuration which differs from the common physical configuration shared by the workpieces in each of the other sets.

2. A mathematics visual aid useful in teaching the importance of the place-value components 1, 10, 100, . . . . $10^n$ ($n=0, 1, 2, \ldots$), which comprises:
 a support member:

divider means formed on a surface of said support member for defining a plurality of columns of work areas and at least first and second rows of work areas; and a plurality of sets of workpieces, the number of said sets corresponding to the number of said columns of work areas, each of said columns having a unique set of workpieces associated therewith, the workpieces within each of said sets each having a physical configuration of one of said place-value components and having the same width as the workpieces within the same set but a different width than the workpieces of other sets, and wherein the width of each of said plurality of columns of work areas is just sufficient to accommodate the width of a workpiece from its associated set of workpieces.

3. The apparatus according to claim 2, wherein the height of each of said workpieces is substantially the same, and wherein the height of each of said columns of work areas in said first row of work areas is sufficient to accommodate no more than nine workpieces placed in an end-to-end planar relationship therein.

4. The apparatus according to claim 3, wherein said surface of said support member comprises a planar surface, and wherein said first row of work areas is positioned adjacent said second row of work areas such that at least one of said plurality of columns of work areas includes a work area in said first row and a work area in said second row each having the same width.

5. The apparatus according to claim 4, wherein the height of each of said columns of work areas in said second row is sufficient to accommodate no more than ten workpieces placed in an end-to-end planar relationship therein.

6. The apparatus according to claim 2, wherein said plurality of columns of workpieces are arranged on said surface in increasing widths from right to left, and wherein the right-most column of work areas corresponds to the 1 place-value component, the next adjacent column corresponds to the 10 place-value component, the next adjacent column corresponds to the 100 place-value component, and so on, such that each of said plurality of columns has a unique place-value component associated therewith.

7. The apparatus according to claim 4, further comprising second and third rows of work areas positioned adjacent said first and second rows of work areas such that each of said plurality of columns of work areas includes at least four work areas having the same width, one from each of said rows.

8. The apparatus according to claim 7, further comprising a plurality of sets of numeral workpieces, each set having a physical configuration of one integer of the Arabic numerals, and wherein the height of each of said work areas in said third and fourth rows of work areas is sufficient to accommodate no more than one of said numeral workpieces.

9. The apparatus according to claim 8, wherein said support member further includes means for storing said plurality of workpieces and said plurality of numeral workpieces.

10. The apparatus according to claim 4, wherein each of said plurality of workpieces comprises an integrally-formed three-dimensional number having a substantially planar base so as to be easily manipulated on said planar surface of said support member amongst said plurality of work areas.

11. The apparatus according to claim 4, wherein said divider means comprises a plurality of intersecting divider members attached to said surface and extending upwardly from the plane thereof such that said plurality of work areas comprises a plurality of compartments within which said workpieces may be placed.

12. The apparatus according to claim 11, wherein said planar surface comprises a flannel board and wherein said workpieces are comprised of papier-mache.

* * * * *